United States Patent Office 2,822,350
Patented Feb. 4, 1958

2,822,350
PRODUCTION OF LINEAR MALEIC POLYESTERS

Robert A. Hayes, Akron, Ohio, assignor to The Firestone Tire & Rubber Company, Akron, Ohio, a corporation of Ohio No Drawing. Application May 7, 1954
Serial No. 428,387

14 Claims. (Cl. 260—78.4)

This invention relates to the production of linear polyesters of maleic acid, particularly those suited for eventual cross-linking with styrene to produce the so-called "polyester" resins.

The conventional method of producing linear polyesters of maleic acid consists in the reaction of maleic acid or anhydride with glycols under typical esterification conditions. This requires heating at elevated temperatures on the order of 200° C. which tends to degrade the product. Likewise, this reaction results in the evolution of water which must be removed, frequently under vacuum. The equipment required for the conventional process is elaborate and expensive, since the process requires the application of high temperatures, reflux in at least the initial stages of the esterification, and separation and diversion of the evolved water. The requirement of vacuum in the conventional process introduces further complications, particularly the necessity of strengthening the vessel to prevent collapse under vacuum, and the provision and maintenance of the vacuum-generating equipment.

Accordingly, it is an object of this invention to provide a method for the preparation of linear polyesters of maleic acid which may be carried out at low temperatures.

Another object is to provide such a process which will make use of mild conditions and catalysts, not harmful to the polyester product.

A further object is to provide such a process in which there is no necessity for the removal of water.

A still further object is to provide such a process which can be carried out in simple and inexpensive equipment with a minimum of skilled supervision and with the use of relatively short time cycles of operation so as to make the maximum use of the equipment.

SYNOPSIS OF THE INVENTION

The above and other objects are secured, in accordance with this invention, in a process which involves reacting (A) maleic anhydride with (B) an alkylene oxide which may be ethylene, propylene, or butylene oxide at temperatures in the range of 30°–150° C., preferably 65°–85° C. The reaction may be accelerated by the presence of catalytic amounts of strong bases or salts or hydroxides thereof. Esterification proceeds rapidly and smoothly to yield linear polyalkylene maleates of a degree of polymerization suitable for cross-linking with styrene to produce the well-known polyester resins. Anhydrides of the dicarboxylic acids other than maleic, if present in the reaction mass, will be drawn into the esterification reaction, and it is to be understood that reactions involving such other dicarboxylic acid anhydrides are to be included in the scope of this invention, provided the amount of maleic anhydride present is sufficient that the resultant ester is characterized by the necessary unsaturatiton for cross-linking with styrene, i. e., the maleic anhydride must be present to the extent of at least 20 mole percent of all anhydrides involved in the reaction. The reactants are supplied to the process of this invention in the mole ratio of alkylene oxide:total acid anhydrides of 4:1 to 0.9:1.0.

THE ALKYLENE OXIDE

The alkylene oxides used in this invention may be ethylene oxide, propylene oxide, or butylene oxide. Under the conditions of this reaction, these oxides tend, to some extent, to condense with themselves in the polyester chain, and this may be very desirable in some cases where it is advantageous to produce a final product containing greater amounts of the alkylene oxides than would be stoichiometrically equivalent to the anhydride used. For this reason, it may be desirable to increase the ratio of alkylene oxide:anhydride in the reaction mixture to values as high as 4:1. There appears, however, to be an alternating tendency, and the products will usually be closer to the 1:1 ratio than the mixtures from which they are derived. There does not appear to be any tendency for the anhydrides to repeat themselves in the chain, so that there is no point in reducing the ratio of alkylene oxide:anhydride below the other extreme cited, namely 0.9:1.0.

ANHYDRIDES OTHER THAN MALEIC

As noted above, anhydrides of organic dicarboxylic acids other than maleic, if present in the reaction mixtures of this invention, will be drawn into the esterification reaction along with the maleic anhydride. This is often quite desirable where it is necessary to change the properties of the final styrene cross-linked product, or where material costs favor substitution. Suitable acid anhydrides of this sort include, for instance, phthalic anhydride, succinic anhydride, glutaric anhydride, octenyl succinic anhydride, dodecenenyl succinic anhydride, tetrahydrophthalic anhydride, dihydrophthalic anhydride, tetrachlorophthalic anhydride and other similar mono-, di-, tri-, or tetra-substituted phthalic anhydrides.

THE CATALYSTS

As noted above, the reactions of this invention are greatly accelerated by the presence of strong bases, and hydroxides and salts thereof. The cationic portion of such catalysts may include for instance, alkali and alkaline earth metal ions, and primary, secondary, tertiary and quaternary organic ammonium ions. The anionic portions of such catalysts may include organic acyl radicals, chloride ions, nitrate ions, hydroxy ions, alkoxy ions, etc. All of the catalysts exert their optimum effect in the presence of at least small amounts of water. The catalysts will be employed in the proportion of from about 0.05 to 5% based on the weight of the reaction mixture, and the water which assists the action of the catalyst should be present to the extent of at least 10% based on the weight of the catalyst. Suitable exemplary catalysts include for instance, sodium hydroxide, sodium chloride, sodium acetate, sodium phthalate, sodium ethoxide, calcium chloride, calcium hydroxide, potassium nitrate, diethyl cyclohexylamine, morpholine, dimethylamine, diethylenetriamine and the like.

THE REACTION CONDITIONS

The reaction of this invention can be carried out in very simple equipment which may be, for instance, a reaction kettle provided with heating and cooling means and preferably with means for agitation. This reactor should be closable and sufficiently strong to withstand the moderate pressure generated by the alkylene oxides under the reaction conditions. The reaction is somewhat exothermic, so that means must be provided for removing the heat once the reaction is started. However, the evolution of heat is neither violent nor explosive, and the reaction is easily controlled at all times. The temperature should be kept within the range 30°–150° C., preferably 65–85° C., with best results about 70° C. Under these conditions the reaction will be completed within 24 hours.

With the foregoing general discussion in mind there are given herewith detailed specific examples of the practice of this invention. All parts given are by weight.

*Example I.—Condensation of mixed maleic and phthalic anhydrides with propylene oxide*

|  | Parts |
|---|---|
| Maleic anhydride | 12.2 |
| Phthalic anhydride | 18.5 |
| Propylene oxide | 15.9 |
| Diethylene triamine | 2.0 |

The above ingredients were charged into a reactor, which was then sealed. The temperature was adjusted to 70° C. and the contents agitated for 18 hours. A viscous flowable polyester resulted.

The entire reaction mixture prepared as just described was blended with 20 parts of styrene and 0.01 part of hydroquinone at 50° C. resulting in a substantially complete solution. 1% of benzoyl peroxide was added to this solution which was then placed in molds shaped for the production of mechanical test specimens and heated at 50° C. for 16 hours and then at 125° C. for 2 hours. The resultant cast specimens had the following properties:

Modulus at room temperature
lbs. per sq. inch__ 510,000
Modulus at 180° F_____do____ 60,600
Rockwell hardness at room temperature, M scale  106
Water absorption:
  24 hours at room temperature____percent__ 0.32
  After 6 hours in boiling water____do____ 3.8

The catalyzed polyester-styrene solution was also impregnated into a glass fabric and cured in a press at 120° C. for 30 minutes. The resultant laminate had the following properties.

Modulus of elasticity at room temperature__ 2,180,000
Modulus of elasticity at 180° F_____ 634,000
Rockwell hardness (M scale)_____ 106
Flexural strength:
  Dry_____lbs. per sq. inch__ 44,500
  Wet _____do____ 26,800

*Example II.—Maleic anhydride-propylene oxide condensate*

|  | Parts |
|---|---|
| Maleic anhydride | 24.4 |
| Propylene oxide | 15.9 |
| Diethylene triamine | 2.0 |

The above ingredients were agitated together in a reactor at 79° C. for 20 hours. There resulted a viscous polyester.

*Example III.—Sodium hydroxide catalyst*

|  | Parts |
|---|---|
| Maleic anhydride | 12.2 |
| Phthalic anhydride | 18.5 |
| Propylene oxide | 15.9 |
| Sodium hydroxide solution (50% solution in water) | 0.2 |

The above ingredients were agitated together at 70° C. in a closed vessel for 22 hours. The resultant product was an amber, glass-like material.

The entire charge prepared as above described was dissolved in 20 parts of styrene together with .01 part of hydroquinone. Samples of this solution were polymerized to make cast articles and glass fiber laminates as described in Example I.

*Example IV.—Disodium phthalate catalyst*

|  | Parts |
|---|---|
| Maleic anhydride | 12.2 |
| Phthalic anhydride | 18.5 |
| Propylene oxide | 15.9 |
| Disodium phthalate solution (50% solution in water) | 2.0 |

The above ingredients were charged into a reactor which was then purged with nitrogen and closed. The temperature was adjusted to 66° C. and the contents agitated for 20 hours. The resultant product was a viscous water-white polyester product. Products made therefrom by cross-linking with styrene had the same excellent properties characterizing the products of the preceding examples.

*Example V.—Trimethylamine catalysis*

|  | Parts |
|---|---|
| Maleic anhydride | 12.2 |
| Phthalic anhydride | 18.5 |
| Propylene oxide | 23.2 |
| Trimethylamine solution (25% solution in water) | 0.3 |

The above ingredients were heated together at 70° C. for 22 hours. The resultant polyester product was a viscous fluid.

*Example VI.—Maleic-phthalic anhydride, ethylene-propylene oxide condensates*

|  | Parts |
|---|---|
| Maleic anhydride | 12.2 |
| Phthalic anhydride | 18.5 |
| Ethylene oxide | 6.6 |
| Propylene oxide | 8.7 |
| Water | 0.3 |
| Sodium hydroxide solution (50% solution in water) | 0.05 |

The above ingredients were heated together at 70° C. for 17 hours. The resultant polyester product was a light-colored, clear, highly viscous fluid having an acid number of 33.

*Example VII.—Various sodium ion catalysts*

|  | Parts |
|---|---|
| Maleic anhydride | 12.2 |
| Phthalic anhydride | 18.5 |
| Propylene oxide | 17.4 |
| Catalyst (per Table I) | Per Table I |

TABLE I

| Run No. | Parts | Catalyst |
|---|---|---|
| 1 | 0.01 / 0.5 | 50% aqueous sodium hydroxide solution plus ethanol. |
| 2 | 0.01 / 0.5 | 50% aqueous sodium hydroxide solution plus adipic acid. |
| 3 | 0.01 / 0.5 | 50% aqueous sodium hydroxide solution plus glacial acetic acid. |
| 4 | 0.5 / 0.5 | sodium acetate plus water. |
| 5 | 0.01 / 0.5 | 50% aqueous sodium hydroxide solution plus ethylene glycol. |

A series of esterifications was run using the ingredients set forth in the recipe above with various catalysts as set forth in Table I. In each case the ingredients and selected catalyst were agitated and heated together at 70° C. for 20 hours. All of the products were viscous liquids. The acid number of the product of run No. 4 was 34.

*Example VIII.—Sodium chloride catalysis*

|  | Parts |
|---|---|
| Maleic anhydride | 50 |
| Phthalic anhydride | 74 |
| Propylene oxide | 34.8 |
| Ethylene oxide | 26.4 |
| Sodium chloride solution (30% solution in water) | 1.2 |

The above ingredients were agitated together at 70° C. for 18 hours. The resultant polymer product was combined with 80 parts of styrene and 0.4 part of hydroquinone and formed a smooth solution therein. Castings and laminates were prepared from this solution as described in Example I and were characterized by excellent properties.

Example IX.—Various catalyst concentrations

| | Parts |
|---|---|
| Maleic anhydride | 50 |
| Phthalic anhydride | 74 |
| Propylene oxide | 34.8 |
| Ethylene oxide | 26.4 |
| Sodium hydroxide solution (50% solution in water) | Per Table II |
| Water | Per Table II |

TABLE II

| Run No. | 1 | 2 | 3 | 4 | 5 |
|---|---|---|---|---|---|
| Sodium Hydroxide Solution | .25 | .25 | .25 | .12 | .12 |
| Water | .09 | 1.4 | 1.9 | 1.0 | 1.5 |
| Acid No | 26 | 34 | 34 | 61 | 68 |

A series of runs was made using the ingredients set forth in the above recipe with different amounts of sodium hydroxide and water in the several runs as set forth in Table II. In each case the selected ingredients were heated together at 70° C. for 18 hours. The resultant products were highly viscous fluids, having acid numbers as tabulated.

To each of the products was added 80 parts of styrene and 0.4 part of hydroquinone. Laminates and castings were made up from the resultant solutions as described in Example I, which products had the following properties:

TABLE III

| Run No. | Hardness Rockwell (M Scale) | Modulus of Elasticity (Pounds per sq. inch) at 25° C. | Modulus of Elasticity (Pounds per sq. inch) at 82° C. | Impact Strength (Ft. lbs. per inch of notch) | Water Absorption (Percent after 24 hours immersion) |
|---|---|---|---|---|---|
| 1 | 76 | 1,670,000 | 257,000 | 33.4 | 0.88 |
| 2 | 85 | 1,865,000 | 262,000 | 34.9 | 1.02 |
| 3 | 60 | 1,470,000 | 245,000 | 39.3 | 1.2 |
| 4 | 71 | 1,350,000 | 182,000 | 40.4 | 0.80 |
| 5 | 44 | 1,360,000 | 248,000 | 37.3 | 1.39 |

Example X.—Calcium ion catalysis

| | Parts |
|---|---|
| Maleic anhydride | 50 |
| Phthalic anhydride | 74 |
| Propylene oxide | 34.8 |
| Ethylene oxide | 26.4 |
| Catalyst: | |
| (A) Calcium chloride solution (20% aqueous) | 1 |
| or | |
| (B) Calcium hydroxide | 0.3 |
| Water | 0.7 |

Two runs were made in accordance with the foregoing recipe, one using calcium chloride solution and the other using the calcium hydroxide as catalyst. In each case the selected ingredients were charged into a vessel and heated at 70° C. for 18 hours. There resulted viscous liquid polyester products in both cases.

Example XI.—Miscellaneous catalysts

| | Parts |
|---|---|
| Maleic anhydride | 50 |
| Phthalic anhydride | 74 |
| Propylene oxide | 50 |
| Catalyst: | |
| (A) Water | 1 |
| Hydrochloric acid (conc.) | 0.25 |
| Sodium chloride | 0.3 |
| or | |
| (B) Water | 1 |
| Potassium nitrate | 0.4 |
| or | |
| (C) Sodium hydroxide (30% aqueous solution) | 1.0 |
| Acetic acid | 0.25 |

The above ingredients were heated together at 70° C. for 24 hours. The acid numbers of the products using catalysts (A), (B) and (C) were respectively 49, 42, and 36. The products were dissolved in styrene and castings and laminates made from the solutions as in Example I.

Example XII.—Ratio study

| | Parts |
|---|---|
| Maleic anhydride | Per Table IV |
| Phthalic anhydride | Per Table IV |
| Propylene oxide | Per Table IV |
| Ethylene oxide | Per Table IV |
| Sodium hydroxide (50% aqueous solution) | 1.0 |
| Water | 2.0 |

A series of runs was made in accordance with the foregoing schedule, using the maleic and phthalic anhydrides and alkylene oxides in various ratios as set forth hereinafter in Table IV. In each case the ingredients were charged into a closed vessel and heated and agitated at 70° C. for 17 hours. In each case there resulted polyesters, the acid numbers of which are set forth in Table IV. Likewise each product was dissolved in an amount of styrene and hydroquinone as set forth in Table IV and worked up into castings and into fiber glass laminates as described in Example I. The properties of these products were determined and are set forth in the table.

TABLE IV

| | Run No. 1 | Run No. 2 | Run No. 3 | Run No. 4 | Run No. 5 | Run No. 6 |
|---|---|---|---|---|---|---|
| Charge: | | | | | | |
| Phthalic Anhydride | 148 | 148 | 148 | 148 | | |
| Maleic Anhydride | 100 | 100 | 100 | 100 | 200 | 200 |
| Propylene Oxide | 116 | 127 | 58 | 63.8 | 116 | 127 |
| Ethylene Oxide | | | 44 | 48.4 | | |
| Acid Number of Product | 71 | 34 | 63 | 33 | 90 | 54 |
| Additives for Resin Solution: | | | | | | |
| Styrene | 157 | 162 | 151 | 156 | 137 | 141 |
| Hydroquinone | .08 | .08 | .08 | .08 | .07 | .07 |
| Properties of Castings: | | | | | | |
| Modulus of Elasticity (Pounds per square inch) | 340,000 | 400,000 | 316,000 | 354,000 | 600,000 | 595,000 |
| Rockwell Hardness (M Scale) | 75 | 79 | 57 | 56 | 107 | 103 |
| Water Absorption (Percent) | 0.57 | 0.49 | 0.55 | 0.57 | 0.30 | 0.31 |
| Properties of Glass Fiber Laminates: | | | | | | |
| Modulus of Elasticity— | | | | | | |
| at 25° C | 2,180,000 | 2,500,000 | 2,250,000 | 1,970,000 | 2,400,000 | 2,680,000 |
| at 82° C | 567,000 | 543,000 | 685,000 | 484,000 | 1,750,000 | 1,660,000 |
| Rockwell Hardness (M Scale) | 106 | 107 | 103 | 87 | 114 | 112 |
| Izod Impact Strength (Foot pounds/inch notch) | 22.3 | 20.8 | 18.2 | 20.0 | 14.6 | 14.5 |
| Flexural Strength— | | | | | | |
| original | 39,300 | 40,800 | 47,600 | 41,600 | 76,000 | 76,000 |
| after 2 hours in boiling water | 14,700 | 30,000 | 18,800 | 18,100 | 24,500 | 23,450 |

*Example XIII.—Maleic-succinic anhydride, propylene-ethylene oxide condensates*

| | Parts |
|---|---|
| Maleic anhydride | [1] 75–25 |
| Succinic anhydride | [1] 25–75 |
| Propylene oxide | 29 |
| Ethylene oxide | 22 |
| Sodium hydroxide solution (50% aqueous) | 0.9 |

[1] Per Table V.

A series of runs was made in accordance with the foregoing schedule using the succinic and maleic anhydrides in various proportions as indicated in Table V. In each case the ingredients were charged into a reactor and agitated at 70° C. for 18 hours. Following are the ratios charged and the properties of the products.

TABLE V

| Run No. | Maleic Anhydride | Succinic Anhydride | Acid Number | Remarks |
|---|---|---|---|---|
| 1 | 75 | 25 | 66 | Viscous polyester. |
| 2 | 50 | 50 | 108 | Do. |
| 3 | 25 | 75 | | Viscous polyester; some excess alkylene oxide unreacted. |

*Example XIV.—Condensation of mixed maleic and phthalic anhydrides with ethylene oxide*

| | Parts |
|---|---|
| Maleic anhydride | 12.2 |
| Phthalic anhydride | 18.5 |
| Ethylene oxide | 13.2 |
| Water | 0.5 |
| Sodium hydroxide solution (50% aqueous) | 0.05 |

The above ingredients were reacted together at 70° C. for 17 hours. The resultant polyester had an acid number of 45.

From the foregoing general discussion and detailed specific examples, it will be seen that this invention provides a novel method for the preparation of polyester-styrene resins. The process is expeditiously carried out in simple equipment and with a minimum of skilled attendance. The reactants, the maleic and other anhydrides, and the alkylene oxides are cheaply and abundantly available.

What is claimed is:

1. Process which comprises reacting together at temperatures in the range 30°–150° C. (A) a substance selected from the group consisting of maleic anhydride and mixtures of maleic anhydride with anhydrides of other dicarboxylic acids, said mixtures containing at least 20% by weight of maleic anhydride with (B) an alkylene oxide selected from the group consisting of ethylene, propylene and butylene oxides, and mixtures of said oxides, in the presence of from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, together with at least 10% of water, based on the weight of said selected catalysts.

2. Process which comprises reacting together at temperatures in the range 30°–150° C. (A) maleic anhydride with (B) an alkylene oxide selected from the group consisting of ethylene, propylene, and butylene oxides, and mixtures of said oxides, in the presence of from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, together with at least 10% of water, based on the weight of said selected catalysts.

3. Process which comprises reacting together at temperatures in the range 30°–150° C. (A) maleic anhydride with (B) propylene oxide in the presence of from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, together with at least 10% of water, based on the weight of said selected catalysts.

4. Process which comprises reacting together at temperatures in the range 30°–150° C. (A) a mixture of maleic anhydride and phthalic anhydride containing at least 20% maleic anhydride with (B) an alkylene oxide selected from the group consisting of ethylene, propylene and butylene oxides, and mixtures of said oxides, in the presence of from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, together with at least 10% of water, based on the weight of said selected catalysts.

5. Process which comprises reacting together at temperatures in the range 30°–150° C. (A) a mixture of maleic anhydride and phthalic anhydride containing at least 20% maleic anhydride with (B) ethylene oxide in the presence of from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, together with at least 10% of water, based on the weight of said selected catalysts.

6. Process which comprises reacting together at temperatures in the range 30°–150° C. (A) a mixture of maleic anhydride and phthalic anhydride containing at least 20% maleic anhydride with (B) propylene oxide in the presence of from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, together with at least 10% of water, based on the weight of said selected catalysts.

7. Process which comprises reacting together at temperatures in the range 30°–150° C. (A) a mixture of maleic anhydride and phthalic anhydride containing at least 20% maleic anhydride with (B) a mixture of ethylene and propylene oxide in the presence of from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, together with at least 10% of water, based on the weight of said selected catalysts.

8. Process which comprises reacting together at temperatures in the range 30°–150° C. (A) a substance selected from the group consisting of maleic anhydride and mixtures of maleic anhydride with anhydrides of other organic dicarboxylic acids, said mixtures containing at least 20% by weight of maleic anhydride with (B) an alkylene oxide selected from the group consisting of ethylene, propylene and butylene oxides and mixtures of said oxides, in the presence of from 0.05 to 5.0%, based on the weight of reaction mixture, of sodium hydroxide, together with at least 10% of water, based on the weight of said sodium hydroxide.

9. Process which comprises reacting together at temperatures in the range 30°–150° C. (A) a substance selected from the group consisting of maleic anhydride and mixtures of maleic anhydride with anhydrides of other organic dicarboxylic acids, said mixtures containing at least 20% by weight of maleic anhydride with (B) an alkylene oxide selected from the group consisting of ethylene, propylene and butylene oxides and mixtures of said oxides, in the presence of from 0.05 to 5.0%, based on the weight of reaction mixture, of an organic amine, together with at least 10% of water, based on the weight of said amine.

10. Process which comprises reacting together at temperatures in the range 30°–150° C. (A) a substance selected from the group consisting of maleic anhydride and mixtures of maleic anhydride with anhydrides of other organic dicarboxylic acids, said mixtures containing at least 20% by weight of maleic anhydride with (B) an alkylene oxide selected from the group consisting of ethylene, propylene and butylene oxides and mixtures of said oxides, in the presence of from 0.05 to 5.0%, based on the weight of reaction mixture, of sodium phthalate, together with at least 10% of water, based on the weight of said sodium phthalate.

11. Process which comprises reacting together at temperatures in the range 30°–150° C. (A) a substance selected from the group consisting of maleic anhydride and mixtures of maleic anhydride with anhydrides of other organic dicarboxylic acids, said mixtures containing at least 20% by weight of maleic anhydride with (B) an alkylene oxide selected from the group consisting of ethylene, propylene and butylene oxides and mixtures of said oxides, in the presence of from 0.05 to 5.0%, based on the weight of reaction mixture, of sodium acetate, together with at least 10% of water, based on the weight of said sodium acetate.

12. Process which comprises reacting together at a temperature of approximately 70° C. (A) a substance selected from the group consisting of maleic anhydride and mixtures of maleic anhydride with anhydrides of other organic dicarboxylic acids, said mixtures containing at least 20% by weight of maleic anhydride with (B) an alkylene oxide selected from the group consisting of ethylene, propylene and butylene oxides, and mixtures of said oxides, in the presence of from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, together with at least 10% of water, based on the weight of said selected catalysts.

13. Process which comprises reacting together at a temperature of approximately 70°C. (A) maleic anhydride with (B) propylene oxide in the presence of from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides, of organic amines, together with at least 10% of water, based on the weight of said selected catalysts.

14. Process which comprises reacting together at a temperature of approximately 70° C. (A) a mixture of maleic anhydride and phthalic anhydride containing at least 20% maleic anhydride with (B) ethylene oxide in the presence of from 0.05 to 5.0%, based on the weight of the reaction mixture, of a catalyst selected from the group consisting of alkali metal salts, alkali metal hydroxides, alkaline earth metal salts, alkaline earth metal hydroxides, salts of organic amines and hydroxides of organic amines, together with at least 10% of water, based on the weight of said selected catalysts.

References Cited in the file of this patent

UNITED STATES PATENTS 2,255,313    Ellis _____ Sept. 9, 1941

FOREIGN PATENTS 500,300    Great Britain _____ Feb. 7, 1939

U. S. DEPARTMENT OF COMMERCE

PATENT OFFICE

CERTIFICATE OF CORRECTION

Patent No. 2,822,350                         February 4, 1958

Robert A. Hayes

It is hereby certified that error appears in the printed specification of the above numbered patent requiring correction and that the said Letters Patent should read as corrected below.

Column 8, lines 2, 37 and 49, after "oxide", each occurrence, insert a comma; column 10, line 10, after "oxide" insert a comma; line 15, after "hydroxides" strike out the comma; line 21, after "oxide" insert a comma.

Signed and sealed this 29th day of April 1958.

(SEAL)

Attest:

KARL H. AXLINE

Attesting Officer

ROBERT C. WATSON
Commissioner of Patents